(12) United States Patent
Pappageorge et al.

(10) Patent No.: US 8,053,033 B2
(45) Date of Patent: Nov. 8, 2011

(54) BRAKE CALIPER PAINT APPLICATOR

(75) Inventors: George Pappageorge, Englewood, NJ (US); Cedric Warren, Englewood, NJ (US)

(73) Assignee: Arro-Mark Company, LLC, Englewood, NJ (US)

( * ) Notice: Subject to any disclaimer, the term of this patent is extended or adjusted under 35 U.S.C. 154(b) by 507 days.

(21) Appl. No.: 12/317,484

(22) Filed: Dec. 23, 2008

(65) Prior Publication Data

US 2010/0159141 A1 Jun. 24, 2010

(51) Int. Cl.
*B05D 1/36* (2006.01)
*B05D 7/00* (2006.01)
(52) U.S. Cl. ............. 427/402; 427/404; 427/407.1; 427/420; 427/427.1; 427/427.4; 427/427.6
(58) Field of Classification Search .......... 427/402, 427/404, 407.1, 420, 427.1, 427.4, 427.6
See application file for complete search history.

(56) References Cited

U.S. PATENT DOCUMENTS

2010/0209719 A1\* 8/2010 Borup et al. ............. 428/447

\* cited by examiner

*Primary Examiner* — Eisa Elhilo
(74) *Attorney, Agent, or Firm* — Thomas A. O'Rourke; Bodner & O'Rourke, LLP

(57) ABSTRACT

A method of protecting a brake caliper is provided. The method includes the steps of cleaning an outer surface of a brake caliper and blending a liquid protective covering solution in an applicator mix the coating composition. The applicator is primed to start the flow of the solution. A first coat of the protective solution is applied to the brake caliper and allowed to dry. Additional coats can be applied as desired. The protective solution includes a water based or alcohol based solvent, a binder selected from the group consisting of an acrylic, a polyurethane, a polyester melamine and acrylate resins or blends thereof and an acrylic copolymer.

26 Claims, No Drawings

BRAKE CALIPER PAINT APPLICATOR

FIELD OF THE INVENTION

The present invention is directed to a system of applying a liquid solution of a protective covering or colorant such as paint to brake calipers and the apparatus for use in applying the paint.

BACKGROUND OF THE INVENTION

Most cars today have disc brakes on at least the front two wheels of the vehicle. Many cars have disc brakes on all four wheels. The brake disc or rotor is usually made of cast iron or a ceramic based material. The brake disc has brake pads mounted on a caliper that are forced on to the rotor where friction causes the wheel to stop turning. The brake pads can be powered by a variety of different means. For example, the brake pads can be powered mechanically or hydraulically. The pads can also be powered pneumatically or electromagnetically.

The brake caliper is an assembly that houses the brake pads and pistons. There are fixed calipers that do not move relative to the disk. The fixed caliper uses one or more pairs of opposing pistons to clamp from each side of the disk. This type of caliper is more complex than the floating caliper. A floating caliper also known as a sliding caliper with respect to the disk. The caliper moves along a line that is parallel to the axis of rotation of the disk. A piston on one side of the disk pushes the inner brake pad until it makes contact with the braking surface. Then the piston pulls the caliper body with the outer brake pad so pressure is applied to both sides of the disk.

The caliper typically has a housing that is made from metal or other suitable material. Many of the vehicles today have alloy wheels. These alloy wheels are usually fairly open to reduce the weight of the wheels and to permit air to cool the brake pads. Because of the open nature of many of today's wheels, there is a greater likelihood the caliper can be seen through the wheels. In addition, because the caliper is open to the air there is a risk of corrosion on the caliper from moisture and road salt.

In order to protect the caliper from the elements and reduce the amount of corrosion, it is sometimes desirable to protect the surface of the caliper with a protective coating. The protective coating can be a paint based product or other material. The paint or other protective material must be able to withstand the high temperatures that are generated by the calipers during use. Thus, a high temperature paint is preferable; one such paint is high temperature engine paint.

Painting the calipers is a time consuming process. First, the car should be jacked up and the tires and rims are removed. The entire car should be covered including the wheel well. A drape or newspapers and tape are preferable. The caliper should be cleaned with a wire brush and a cleaning solution. The better the caliper is cleaned the better the paint will stick. The caliper should be removed using the bolts on the back side of the caliper. Once the caliper is removed it should be cleaned again with brake cleaner and a tooth brush. All exposed cylinders should be masked. The caliper should be positioned so that all sides can be accessed and then thoroughly spray painted. The paint should be allowed to dry and then additional coats should be applied with suitable drying between each coat.

It will be appreciated that the traditional manner of painting brake calipers is fairly time consuming, and unless great care is taken in cleaning the caliper, there is a high risk that the paint will not adhere. In addition to being time consuming, it can be difficult for anyone but an experienced mechanic to remove the caliper in a simple and expeditious manner.

OBJECT OF THE INVENTION

It is an object of the invention to provide an improved system for painting brake calipers.

It is also an object of the invention to provide an apparatus for painting brake calipers.

It is a further object of the invention to make it easier to paint brake calipers.

It is another object of the invention to provide a means for painting brake calipers so that the paint will withstand the high temperatures encounters by brake calipers.

SUMMARY OF THE INVENTION

The present invention is directed to a system for painting brake calipers. Brake calipers are subject to high temperature during operation as well as environmental hazards such as water, freezing temperatures, chipping, etc. As a result, any paint that was on the brake caliper when it left the factory has a tendency over time to peel and crack. In addition, car enthusiasts are desirous of painting their calipers to match the rest of their cars or to highlight them by a color selection. Consequently, no matter what color the brake calipers are coming from the manufacturer, certain users will want to change that color to one of their own choosing.

The system of the present invention includes a writing device having a reservoir for holding ink, a metering means that causes paint to flow a desired rate from the reservoir and an application means. The application means applies the paint to the surface of the brake caliper. One example of a suitable application means is described in U.S. Pat. No. 7,086,799, the disclosures of which are incorporated herein by reference.

The present invention also includes a liquid protective covering or colorant solution such as a paint for use in the writing device. The solution is preferably a high temperature colorant solution that is not affected by the high temperature that arises from the friction that is encountered in the caliper during operation.

The system of the present invention provides an application device that can be used to coat or paint a brake caliper without the effort usually encountered in the traditional painting of brake calipers discussed above.

DETAILED DESCRIPTION OF THE INVENTION

The present invention permits a user to apply a protective coating or add color to the brake calipers and permits others to view the high performance look of the brake components through spoked wheels and others. The system of the present invention dries within minutes and cures within twenty-four hours. A heat gun can be used to accelerate the drying and curing, if desired. The colors are fade resistant as well as oil and chemical resistant. The paint can be a water based or alcohol based paint. The paint of the present invention seals and protects the metal of the brake caliper.

In order to treat the brake caliper with the protective coating or colorant in accordance with the present invention, the calipers are cleaned including removal of any original finish and dirt and rust are removed. The applicator is shaken well before use to fully blend the solution and should be shaken periodically during use to keep the components blended. The applicator pen is pumped to start the flow of paint. A base coat is applied to the cleaned surface of the brake caliper. A base coat is usually only preferred for certain colors such as, for example, blue, red and yellow or shades thereof. Once the base coat or primer coat is dry, the first coat of paint is applied. This coat should be applied evenly over the surface of the caliper with the applicator. Once this is dried, one or more additional coats may be applied as desired or as needed to obtain the coverage sought. Each additional coat should be applied after the previous coat has had an opportunity to dry.

A detailing applicator can be used for hard to reach places on the caliper. Once the desired number of coats is applied to the caliper and permitted to dry, the caliper should be treated with an application of clear gloss sealer. Once the calipers have been treated with the paint and sealer, they should not come in contact for about 8 hours. In a preferred embodiment, the present invention is for use with brake calipers that do not have a pre-colored, powder coated surface.

The preferred paint composition is a water or alcohol based paint. The binder in the water based paint may be an acrylic, a vinyl acrylic, also known as polyvinyl acetate, polyurethane both aliphatic and aromatic urethanes, styrenated acrylic, polyester melamine resins or blends thereof. Other resins can include acrylic acids, including esters of acrylic acid, methacrylic acid, acrylonitrile and their copolymers. These are also commonly known as acrylate resins. The binder is preferably a self-crosslinking material. The binder is preferably present in an amount of about 5% to about 35% by weight of the total solution. More preferably, the binder is present in an amount of about 10% to about 25% by weight, most preferably 11% to 14% by weight. In addition to the binder and the solvent, there is preferably about 0.1 to about 8% of an acrylic copolymer; suitable acrylic copolymers include but are not limited to benzyl methacrylate and methacrylic acid. In another embodiment, the acrylic polymer is a styreneacrylic copolymer comprising a mixture of vinyl or unsaturated monomers, including at least one styrenic monomer and at least one acrylic monomer, at least one of which monomers has an acid or acid-providing group. More preferably, the acrylic copolymer is present in about 1% to about 5% by weight of the composition. Most preferably, the acrylic copolymer is present from about 2% to 3% by weight.

The following commercially available styrene-acrylic polymers may be employed in the composition of the invention, for example, styrene-acrylic polymer having acid number 240, sold as Joncryl® 70 from S.C. Johnson Co. (Wisconsin, USA); a styrene-acrylic polymer having acid number 230 sold as TruDot™ IJ-4655 from MeadWestvaco Corp. (Stanford, Conn., USA); a styrene-acrylic polymer having acid number 215 sold as Joncryl® 59 from S.C. Johnson Co.; a styrene-acrylic polymer having acid number 215 sold as Joncryl® 57 from S.C. Johnson Co.; a styrene-acrylic polymer having acid number 213 sold as Joncryl® 63 from S.C. Johnson Co.; a styrene-acrylic polymer having acid number 172 sold as TruDot™ IJ-4680 from MeadWestvaco Corp.; an acrylic resin having acid number 160 sold as Vancryl® 68S from Air Products and Chemicals, Inc. (Allentown, Pa., USA).

There is also preferably an amino compound to adjust the viscosity of the compositions. Suitable amino compounds include 2-aminopropanol-1 (also known as monoisopropanolamine). Other suitable alkanolamines include dimethylethanolamine, diethanolamine, triethanolamine, triisopropanolamine, monoethanolamine, n-butylaminoethanol, diethylaminoethanol, 2-amino-2-methyl-1-propanol, phenyl diethanolamine, diisopropanolamine and the like. Other water-soluble amines such as alkylamines (e.g., triethylamine) and oxazolidines may also be used.

The coating composition of the present invention includes water and a mixture of water and a minor proportion of a water-miscible organic solvent. The water-miscible organic solvent can include alcohols (e.g., methanol, ethanol, propanol, isopropyl alcohol, butanol, isobutanol, sec-butanol, tert-butanol, pentanol, hexanol, cyclohexanol and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol, and thiodiglyol), glycol derivatives (e.g., ethylene glycol, monomethyl ether, ethylene glycol monoethyl ether, ethylene glycol monobutyl ether, diethylene glycol monomethyl ether, diethylene glycol monomethyl ether, diethylene glycolmonobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). The water-miscible organic solvents can be used either individually or as a combination thereof. The water miscible organic solvents are preferably present from about 5% to 15% by weight, more preferably about 8% to 11% by weight.

In addition to the miscible organic solvents present in an amount of 5% to 15%, there may also be present one or more polyols. Examples of useful polyols include, without limitation, 1,4-butanediol, 1,3-butanediol, 2,3-butanediol, 1,2,4-butanetriol, 1,6-hexanediol, 1,2,6-hexanetriol, neopentyl glycol, ethylene glycol, propylene glycol, pentaerythritol, oligomers of these such as diethylene glycol, triethylene glycol, dipropylene glycol, and dipentaerythritol, glycerol, trimethylolpropane, cylcohexandeimethanols, 2-methyl-2-ethyl-1,3-propanediol, 2-ethyl-1,3-hexanediol, 1,5-pentanediol, thiodiglycol, 1,3-propanediol, 2,2,4-trimethyl-1,3-pentanediol, cyclohexanediols, mannitol, sorbitol, and combinations of these. The glycol-polyol component can be present in an amount of about 2% to 10%, more preferably 5% to 8%.

The composition may also include one or more pigments.

In another embodiment the composition that is applied to the brake caliper includes a self crosslinking water base aromatic urethane, which is preferably present in an amount of about 11 to 14% weight percent water-borne urethane polymer and about 2 to 3% by weight styrene acrylic copolymer. The composition preferably includes about 30 to 40% by weight of a dispersible pigment to achieve the desired color of paint. The of viscosity of the composition is from 0 to 10 (cP) and a preferably has a pH of 8 to 9. The viscosity and/or the pH may be adjusted by the addition of about 0.3 to about 1% by weight 2-amino-2-methyl-1-propanol containing 5% water.

One or more coalescing solvents may be present in the composition to allow the polymeric systems to form films at ambient or sub-ambient temperatures. The presence of the coalescing solvent has several effects. The coalescing solvent reduces the total surface energy of the system by reducing polymer surface area. The coalescing solvent increases the capillary forces by the controlled evaporation of the water. The coalescing solvent reduces the repulsive forces between the polymeric particles. The coalescing solvent also allows deformation of the particles in contact with each other by effectively lowering the Tg of the polymer.

Coalescing solvents can include trimethylolpropane monocyclic formal (TMPMCF) or 5-ethyl-5-hydroxymethyl-1,3-dioxane; and trimethylolethane monocyclic formal (TMEMCF), or 5-methyl-5-hydroxymethyl-1,3-dioxane, N-Methyl-2-Pyrolidone and/or Dipropylene glycol monomethyl may also be present in the amount of about 8 to 11% by weight. Propylene glycol and or other polyols may be present in the amount of about 5 to 8% by weight. The remaining composition is comprised of water.

The invention claimed is:

1. A method of protecting a brake caliper comprising:
   a. cleaning an outer surface of a brake caliper;
   b. shaking an applicator to blend a liquid protective covering solution contained therein;
   c. priming the applicator to start the flow of said solution;
   d. applying a first coat of said protective solution;
   e. drying the first coat,
   said protective solution comprising a water based or alcohol based solvent, a binder selected from the group consisting of an acrylic, a polyurethane, a polyester melamine and acrylate resins or blends thereof and an acrylic copolymer.

2. The method according to claim 1 further comprising a pigment.

3. The method according to claim 1 wherein said solution further comprises an amino compound.

4. The method according to claim 3 wherein said solution further comprises a water miscible organic solvent.

5. The method according to claim 4 wherein said solution further comprises one or more polyols.

6. The method according to claim 5 further comprising applying a base coat.

7. The method according to claim 6 further comprising one or more additional coatings applied to the first coat after said first coat has dried.

8. The method according to claim 7 wherein said binder is selected from the group consisting essentially of esters of acrylic acid, methacrylic acid, acrylonitrile and their copolymers.

9. The method according to claim 8 wherein the binder is a self-crosslinking polymeric material.

10. The method according to clam 9 wherein the binder is present in an amount of about 5% to about 35% by weight of the total solution.

11. The method according to claim 10 wherein the binder is present in an amount of about 11% to 14% by weigh of the total solution.

12. The method according to claim 11 wherein there is also about 0.1 to about 8% of an acrylic copolymer.

13. The method according to claim 12 wherein said acrylic copolymers is a benzyl methacrylate.

14. The method according to claim 12 wherein said acrylic copolymers is a methacrylic acid.

15. The method according to claim 12 wherein said acrylic copolymers is a styreneacrylic copolymer comprising a mixture of vinyl or unsaturated monomers, including at least one styrenic monomer and at least one acrylic monomer, at least one of which monomers has an acid or acid-providing group.

16. A method of protecting a brake caliper comprising:
   a. cleaning an outer surface of a brake caliper;
   b. shaking an applicator to blend a liquid protective covering solution contained therein;
   c. priming the applicator to start the flow of said solution;
   d. applying a first coat of said protective solution;
   e. drying the first coat,
   said protective solution comprising a self crosslinking water base aromatic urethane, which comprises about 11 to 14% water-borne urethane polymer and 2 to 3% styrene acrylic copolymer by weight.

17. The method according to claim 16 wherein the solution has about 30 to about 40 percent by weight of a dispersible pigment.

18. The method according to claim 17 wherein the solution has a viscosity from 0 to 10 (cP).

19. The method according to claim 18 wherein the solution has a pH of 8 to 9.

20. The method according to claim 19 wherein the solution further comprises the addition of 0.3 to 1% by weight of 2-amino-2-methyl-1-propanol in 5% water.

21. The method according to claim 20 wherein said solution further comprises about 8% to about 11% by weight N-Methyl-2-Pyrolidone.

22. The method according to claim 21 further comprising about 8 to about 11% weight percent Dipropylene glycol monomethyl.

23. The method according to claim 21 further comprising about 5 to about 8% weight percent of a polyols.

24. The method according to claim 20 further comprising about 8 to about 11% weight percent Dipropylene glycol monomethyl.

25. A brake caliper paint comprising a self crosslinking water based aromatic urethane, which comprises about 11 to 14% by weight water-based urethane polymer and about 2 to 3% by weight styrene acrylic copolymer by weight about 30 to about 40 percent by weight of a dispersible pigment, about 0.3 to 1% by weight of 2-amino-2-methyl-1-propanol in 5% water, about 8 to about 11% by weight N-Methyl-2-Pyrolidone, about 5 to about 8% weight percent of a polyol, said solution having a viscosity from 0 to 10 (cP) and a pH of 8 to 9 and the balance water.

26. A brake caliper paint comprising a self crosslinking water based aromatic urethane, which comprises about 11 to 14% by weight water-based urethane polymer and about 2 to 3% by weight styrene acrylic copolymer by weight about 30 to about 40 percent by weight of a dispersible pigment, about 0.3 to 1% by weight of 2-amino-2-methyl-1-propanol in 5% water, about 8 to about 11% weight percent Dipropylene glycol monomethyl, about 5 to about 8% weight percent of a polyol, said solution having a viscosity from 0 to 10 (cP) and a pH of 8 to 9 and the balance water.

* * * * *